United States Patent [19]

Fujio

[11] 4,188,249
[45] Feb. 12, 1980

[54] PACKAGE INCLUDING AN ELASTIC CONTAINER PROTECTOR AND A METHOD AND MACHINE FOR FITTING THE PROTECTOR

[75] Inventor: Masaaki Fujio, Suita, Japan

[73] Assignee: Fuji Seal Industry Co., Ltd., Japan

[21] Appl. No.: 892,854

[22] Filed: Apr. 3, 1978

[30] Foreign Application Priority Data

Apr. 5, 1977 [JP] Japan .................................. 52/38104

[51] Int. Cl.² .......................... B32B 31/00; B29C 19/00; B29D 3/00
[52] U.S. Cl. ........................................ 156/165; 53/291; 53/585; 156/294; 156/423; 156/494; 206/460; 215/246
[58] Field of Search ................ 206/527, 526, 497, 460, 206/45.33, 0.84, 0.83, 0.8; 229/DIG. 12, 89, 87 R; 53/30, 184, 13, 204, 291, 585; 215/246; 40/310; 156/165, 294, 423, 494

[56] References Cited

U.S. PATENT DOCUMENTS

| | | | |
|---|---|---|---|
| 2,884,328 | 4/1959 | Johnson | 229/DIG. 12 |
| 3,235,112 | 2/1966 | Fillwalk et al. | 229/89 |
| 3,412,524 | 11/1968 | Nestell et al. | 206/0.8 |
| 4,016,704 | 4/1977 | Fujio | 53/585 |
| 4,102,728 | 7/1978 | Smith | 53/291 |

*Primary Examiner*—William T. Dixson, Jr.
*Attorney, Agent, or Firm*—Holman & Stern

[57] ABSTRACT

A package including a container protector which is made of an elastic film tube, the circumference of which is smaller than that of the part of a container over which it is fitted. A method and machine for fitting the protector are also described.

6 Claims, 7 Drawing Figures

PACKAGE INCLUDING AN ELASTIC CONTAINER PROTECTOR AND A METHOD AND MACHINE FOR FITTING THE PROTECTOR

This invention relates to a package including a container protector which is to be fitted onto a container, to a method of fitting it thereon, and to a machine for practicing the method.

Previously, a protector such as a cap seal, a label tube, or the like has been made of heat-shrinkable film, and has been fitted to a container by being put over part of it and being heated so that it is shrunk to fit tightly over it.

However, this fitting method has the disadvantage that as soon as the shrinking film touches the container during the shrinkage it is cooled by the container, which usually has a high heat capacity, and thus further shrinkage is arrested or impeded. Therefore sometimes fitting is imperfectly achieved.

In order to overcome this difficulty, it has been proposed, and practiced, to heat the part of the container to be covered to the same temperature as the shrinking temperature of the film. However, if this is done, sometimes the container is distorted, and sometimes the contents of the container are adversely affected.

Therefore it is an object of the present invention to provide a well-sealed package including a container protector which may be fitted in a manner free from the abovementioned disadvantages, which can be sealed without the application of heat, and which is secure, strong, and economical.

It is another object of the present invention to provide a method for fitting a protector onto a container, which method is free from the abovementioned defects, and which is cheap, convenient, and easily operable.

It is still another object of the present invention to provide a machine for putting a protector onto a container, which machine is simple, compact, and convenient.

According to the present invention, these objects are accomplished by providing a package comprising a container and a container protector comprising an elastic film tube fitted over a part of the container, the circumference of the film tube in its unstressed state being smaller than that of said part of the container so that when fitted over said part it is maintained in the stretched condition, a method for putting a container protector comprising an elastic film tube over a part of a container, the circumference of which is larger than that of said elastic film tube in its unstressed state, comprising stretching the film tube, inserting the part of the container inside the stretched film tube, and releasing the film tube so that it grips the part of the container, and a machine for putting a container protector comprising an elastic film tube over a part of a container, the circumference of which is larger than that of said elastic film tube in its unstressed state, comprising a plurality of guide plates which are arranged around an axis and are movable inwards and outwards, and a support means which supports the container, said support means and said guide plates being movable with respect to one another so that said part of said container may be inserted between and withdrawn from between said guide plates.

The present invention will now be described in more detail with reference to a preferred embodiment, which, however, is only one of many possible embodiments which could be conceived of, and with reference to the following drawings, which are, however, only illustrative in character, and are not intended to be limitative of the present invention, and wherein.

Figure 1:
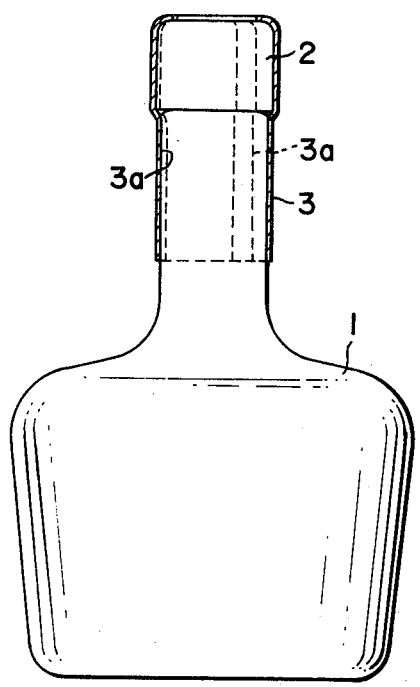
FIG. 1 is a longitudinal sectional view of a package having a cap seal according to the present invention.

Referring to FIG. 1, there is therein shown a bottle 1 having a cap 2 which is sealed by a cap seal 3. The cap seal 3, which is about 0.3–0.4 mm thick, is made of a film such as polythene film or the like, which has about the same elasticity and viscosity as rubber. On this seal there may be provided any desired labelling. The cap seal is made in the form of a tube, which is formed by rolling around and bonding a piece of film.

According to the present invention, the cap seal 3 has a smaller diameter than that of the neck of the bottle 1. Hence, in order to fit the cap seal 3 to the bottle, it needs to be stretched. It is put over the neck of the bottle while being stretched, and then it is released. Due to its elasticity, it promptly shrinks and grips the neck and the cap of the bottle tightly.

Therefore, there is no danger that the cap seal 3 should become loose, or that dust, dirt, or water should intrude in between the bottle 1 and the cap seal 3. Thus, the cap seal 3 further prevents the cap 2 becoming loosened. Further, there is the added, and serendipitous, advantage that the neck of the bottle 1, which is apt to be broken in some cases by the pressure of gases generated by some sorts of contents in the bottle, is squeezed by, and therefore is reinforced by, the cap seal 3.

It is also possible to apply some adhesive 3a inside the cap seal 3, between it and the neck of the bottle 1. In this case the fitting of the seal to the neck of the bottle is facilitated by the lubricating action of the adhesive.

Figure 2:
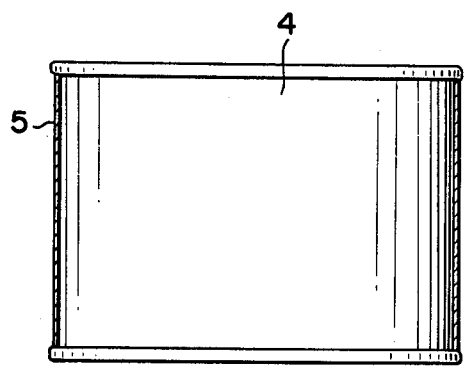
FIG. 2 is a longitudinal sectional view of another package having a label tube according to the present invention.

In FIG. 2 there is shown a can 4 covered by a label tube 5. The label tube 5 is made in the same way, and fitted in the same way, as the cap seal 3 in FIG. 1. When the label tube is printed with a descriptive legend detailing the contents of the can, the outside of the can itself can be left blank without any labelling. The label tube 5 is applied to unlabelled cans stored an a warehouse as occasion demands according to their contents, and this is economical and avoids waste, which is therefore advantageous for stock management. The label tube 5 made of a film is durable and is not spoiled by water, as contrasted with a paper label.

Figure 3:
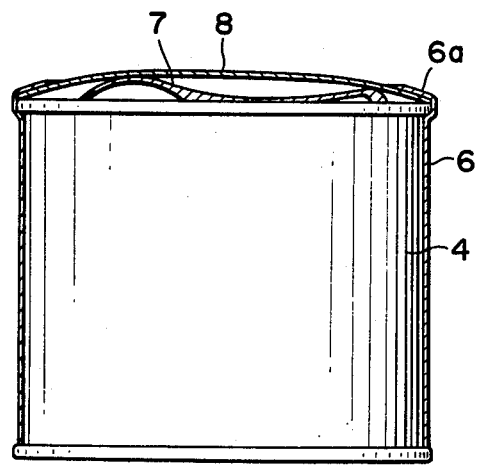
FIG. 3 is a longitudinal sectional view of still another package having a label tube according to the present invention.

In FIG. 3 there is shown a can 4, on the top surface of which a spoon 7, a can cutter, or the like may be laid and covered by a cover plate 8. A label tube 6 surrounds the can 4 and the top end portion 6a of the label tube 6 holds the periphery of the cover plate 8. The label tube 6 is made of the same kind of material and is fitted in the same way as in the cases illustrated in FIGS. 1 and 2. Thus it is seen that the spoon 7 or the like may be easily and securely attached to the can 4 without any possibility of dirt entering and contaminating it.

With reference to FIGS. 4–7, a method and a machine for putting such a protective tube onto a container will now be described.

On an annular base 11 are pivotally mounted a pair of guide plates 12 on opposite sides of the inside annular edge of the annular base 11, on pivot shafts 13. These guide plates each goes around about a quarter of the annular edge of the annular base 11, and they are cut slightly slopewise in the axial direction, as illustrated in the drawing.

These guide plates 12 are made of stainless steel, and their inside surface conforms to the outer surface of the container 14. This inner surface may be coated with, for example, Teflon (trademark) film so as to reduce the friction between them and the container, and the outside surface of the guide members 12 may be roughened so as to increase the friction between them and the protective film to be applied.

A lever 15 extending outwards is integrally coupled to each guide plate at its pivot portion. A spring 16 extending upwards is connected to the outer end of each lever 15, and imparts pivoting force so as to pivot the guide plate inwards.

A pair of holding members 17 are arranged outside the guide plates 12, and these are movable inwards and outwards. A pair of gripping members 18 are also arranged just above the guide plates 12, and these are movable inwards and outwards and also up and down.

The operation of this machine is as follows.

Figure 4:
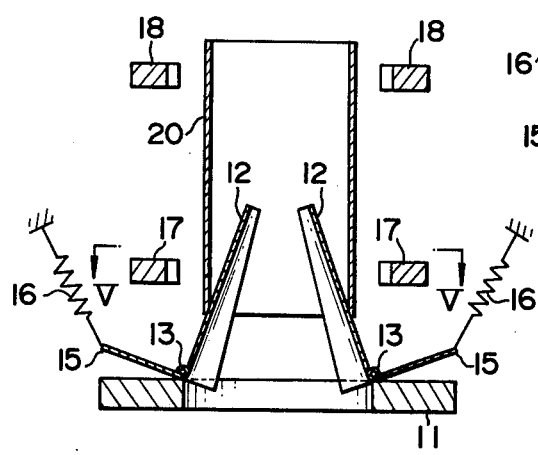
FIG. 4 is a schematic sectional view of a machine according to the present invention for putting a container protector according to the present invention onto a container, in which the container has not yet been inserted between the guide plates of the machine.

First, the holding members 17 and the gripping members 18 are moved outwards, and the latter are moved downwards so as to be just above the guide plates 12. The container 14 is then placed upon the support plate 19, as shown in FIG. 4.

A protective tube 20 which is made of an elastic film which has roughly the same elasticity and viscosity as rubber, and which has a smaller diameter in the unstressed condition than the container, is placed over the outside of the guide members 12, and these members are so sized that the upper edge of the protective tube 20 projects a little above their upper edges.

The support plate 19 is raised, and the container 14 passes through the central hole of the annular base 11 and pushes the guide members 12 outwards around the pivot shafts 13 against the force of the tension springs 16. Of course it would also be possible to open out the guide members 12 by using some opening means, before passing the container 14 through the hole, in another embodiment.

Figure 6:
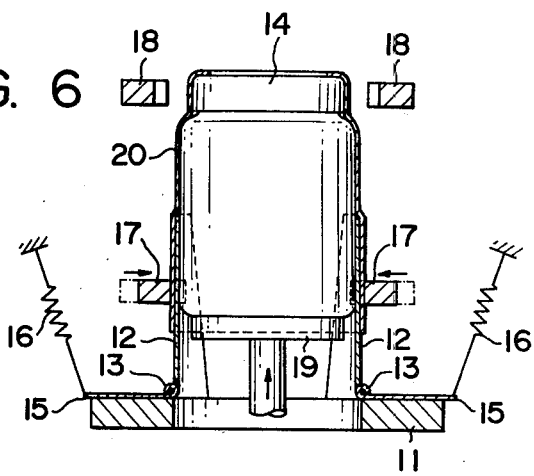
FIG. 6 is a view similar to FIG. 4, in which the container is inserted between the guide plates of the machine.
Figure 7:
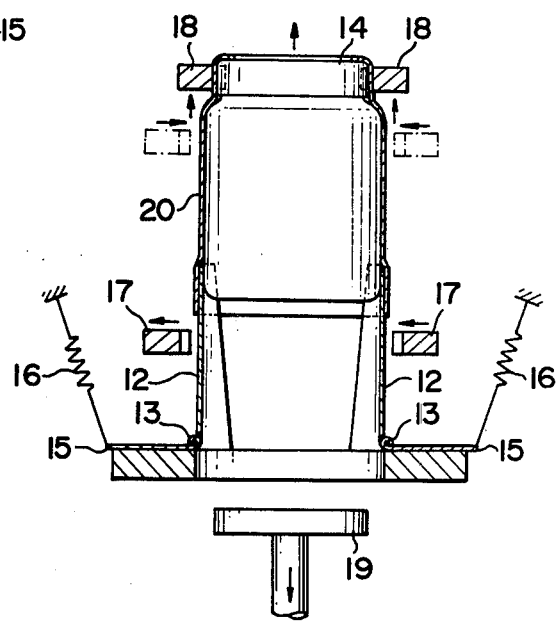
FIG. 7 is a view similar to FIGS. 4 and 6, in which the container with the protector is being removed from the guide plates.
Figure 5:
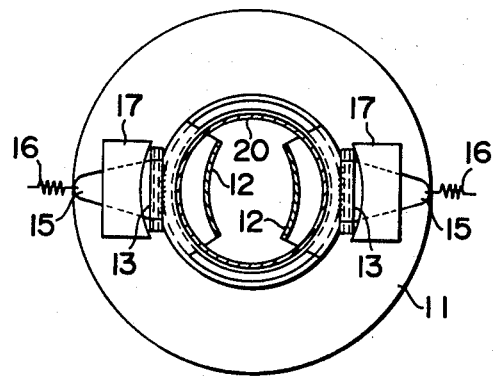
FIG. 5 is a transverse sectional view of the machine illustrated in FIG. 4 along the line V—V in FIG. 4.

In either event, as the guide members 12 are moved outwards, the protective tube 20 is stretched over them. It is also securely held to them without any possibility of slippage by the holding members 17, which are moved inwards, as the guide members 12 are moved outwards, by some appropriate moving means. Thus the protective tube 20 is held as it is slipped over the container, as shown in FIG. 6.

When the container has fully moved upwards so that the protective tube 20 is in the right position with respect to it, the push members 17 are withdrawn outwards and simultaneously the gripping members 18 are moved inwards and grip the upper part of the container 14 through the film 20. Then the gripping members 18 are raised, still holding the container, and the guide plates 12 are withdrawn from between the protective tube 20 and the container 14 so that the tube contacts tightly the container 14.

The holding members 17, the gripping members 18, and the support plate 19 are moved by a cam mechanism, limit switches, air cylinders or the like, with the desired timings. The details of their propulsion of course are not germane to the present invention.

In some embodiments it may not be necessary to provide the holding members 17 and/or the gripping members 18. Further, instead of moving the support plate 19, the annular base may be moved. Further, the number and the mode of fixing of the guide plates 12 may of course vary within the limits of the present invention.

Further, as described above, it is envisaged that in some applications adhesive may be employed in order to fix the protective tube more securely to the container. In that case it is necessary to provide a means in the above-described machine to apply adhesive to the inside of the tube or to the outside of the container.

What is claimed is:

1. A method for putting a container protector comprising an elastic film tube over a part of a container, the circumference of which is larger than that of the elastic film in its unstressed state comprising:
   putting the film tube over a plurality of guide plates which are arranged around an axis and are movable inwards and outwards,
   stretching the film tube by moving said guide plates outwardly,
   inserting the part of the container inside the stretched film tube,
   releasing the film tube so that it grips part of the container, and
   gripping the film tube onto the container with gripping members while removing said guide plates.

2. The method according to claim 1, further comprising holding the film tube onto the guide plates from the outside with holding members while the container is being inserted between the guide plates.

3. The method acording to any one of claims 2 or 1 further comprising applying adhesive between the film tube and the container.

4. A machine for putting a container protector comprising an elastic film tube over a part of a container, the circumference of which is larger than that of said elastic film tube in its unstressed state, comprising a plurality of guide plates which are arranged around an axis and are movable inwards and outwards, gripping members which grip the film tube onto the container; and a support means which supports the container, said support means and said guide plates being movable with respect to one another so that said part of said container may be inserted between and withdrawn from between said guide plates.

5. A machine as in claim 4, further comprising holding members which hold the film tube onto the guide plates from the outside.

6. A machine according to any one of claims 4 or 5, further comprising adhesive applying means which apply adhesive to the inside of the film tube between it and the container.

* * * * *